(12) United States Patent
Gimbert

(10) Patent No.: US 12,227,354 B2
(45) Date of Patent: Feb. 18, 2025

(54) WAREHOUSE STORAGE AND RETRIEVAL SYSTEM FOR FISHING RODS AND FISHING ROD BLANKS

(71) Applicant: MUD HOLE CUSTOM TACKLE, INC., Oviedo, FL (US)

(72) Inventor: Scott W. Gimbert, Oviedo, FL (US)

(73) Assignee: FOUNDATION OUTDOOR GROUP, INC., Oviedo, FL (US)

( * ) Notice: Subject to any disclaimer, the term of this patent is extended or adjusted under 35 U.S.C. 154(b) by 855 days.

(21) Appl. No.: 17/405,695

(22) Filed: Aug. 18, 2021

(65) Prior Publication Data
US 2022/0177224 A1 Jun. 9, 2022

Related U.S. Application Data

(60) Provisional application No. 63/122,595, filed on Dec. 8, 2020.

(51) Int. Cl.
*G08B 5/22* (2006.01)
*B65G 1/04* (2006.01)
*B65G 1/137* (2006.01)

(52) U.S. Cl.
CPC ......... *B65G 1/0485* (2013.01); *B65G 1/0442* (2013.01); *B65G 1/1371* (2013.01); *G08B 5/22* (2013.01); *B65G 2201/0217* (2013.01); *B65G 2203/0216* (2013.01); *B65G 2207/08* (2013.01)

(58) Field of Classification Search
CPC .. B65G 1/0485; B65G 1/0442; B65G 1/1371; B65G 2201/0217; B65G 2203/0216; B65G 2207/08; G08B 5/22
See application file for complete search history.

(56) References Cited

U.S. PATENT DOCUMENTS

| 3,536,194 A | * | 10/1970 | Novak | G06K 17/00 |
| | | | | 212/319 |
| 3,966,159 A | * | 6/1976 | Brown | B65G 1/0442 |
| | | | | 248/250 |

(Continued)

OTHER PUBLICATIONS

Safco Stackable Steel Blueprint Storage Roll File—36 Roll Model, available at https://www.globalindustrial.com/p/safco-stackable-steel-blueprint-storage-roll-file-36-roll-model-2?ref=5, 2021.

*Primary Examiner* — Patrick H Mackey
(74) *Attorney, Agent, or Firm* — ALLEN, DYER ET AL.

(57) ABSTRACT

A warehouse storage and retrieval system for fishing rod blanks includes a framework structure comprising a plurality of front horizontal supports, and a plurality of rear horizontal supports. The system also includes a plurality of individual storage receptacles supported between the plurality of front horizontal supports and the rear horizontal supports in a horizontal orientation, where each receptacle has an open end proximate the plurality of front horizontal supports and an opposing closed end proximate the plurality of rear horizontal supports. The system includes a plurality of fishing rod blanks within the plurality of individual storage receptacles, and each fishing rod blank having an identifying tag storing data. In addition, the system includes a database storing a spatial location of each of the fishing rod blanks corresponding to a respective individual storage receptacle within the framework structure.

15 Claims, 4 Drawing Sheets

(56) References Cited

U.S. PATENT DOCUMENTS

| | | | | |
|---|---|---|---|---|
| 4,063,653 A | * | 12/1977 | Halada | B65G 1/0442 |
| | | | | 414/277 |
| 4,223,795 A | * | 9/1980 | Akers | B65D 41/06 |
| | | | | 215/222 |
| 7,941,243 B2 | | 5/2011 | Borgwarth et al. | |
| 9,171,278 B1 | * | 10/2015 | Kong | B65G 1/137 |
| 9,604,782 B2 | | 3/2017 | Winkler | |
| 2005/0216294 A1 | * | 9/2005 | Labow | G06Q 10/08 |
| | | | | 705/333 |
| 2013/0129453 A1 | | 5/2013 | Salichs et al. | |
| 2017/0228817 A1 | * | 8/2017 | Brown | G06Q 30/0645 |
| 2021/0269244 A1 | * | 9/2021 | Ahmann | B65G 1/0492 |
| 2022/0033174 A1 | * | 2/2022 | Drake | B65G 1/02 |

* cited by examiner

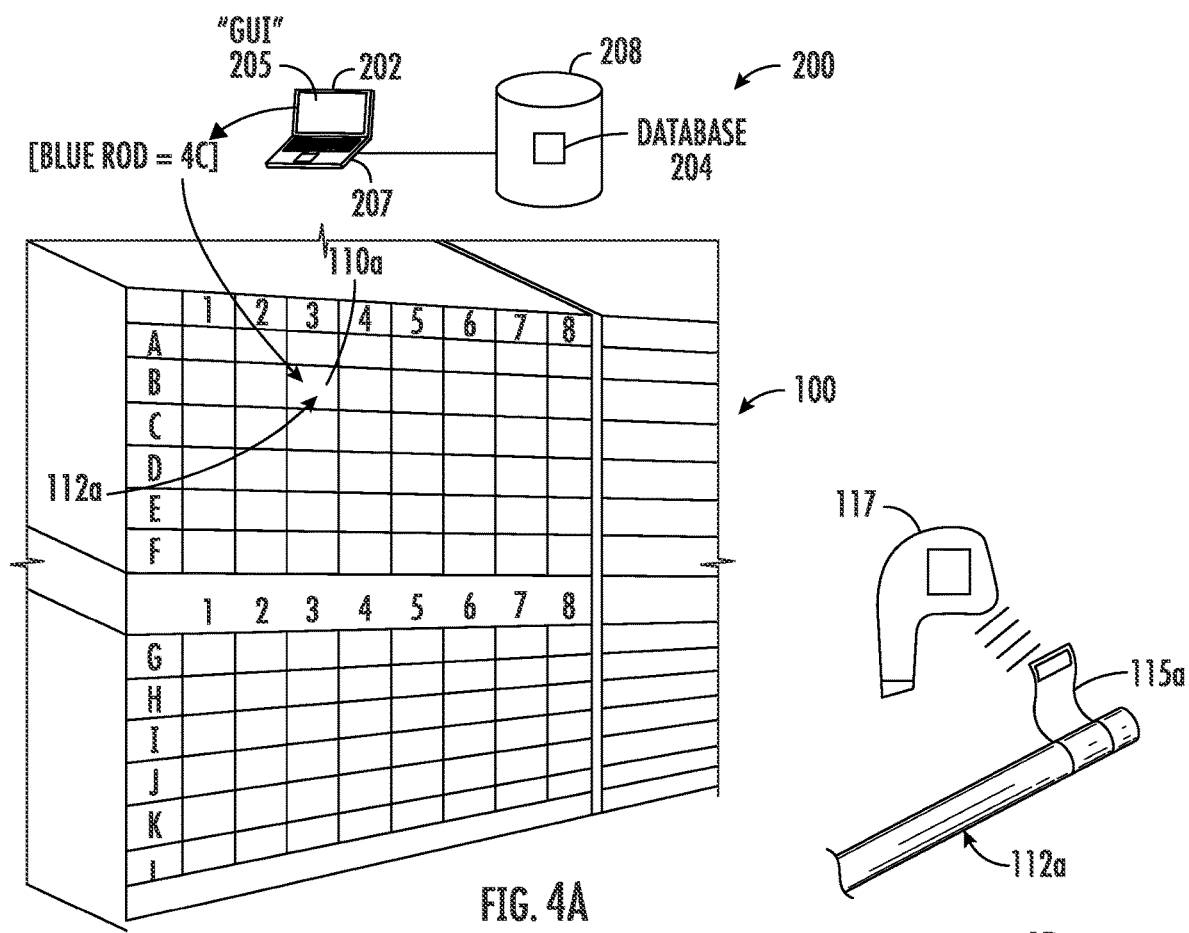
FIG. 4A
FIG. 4B
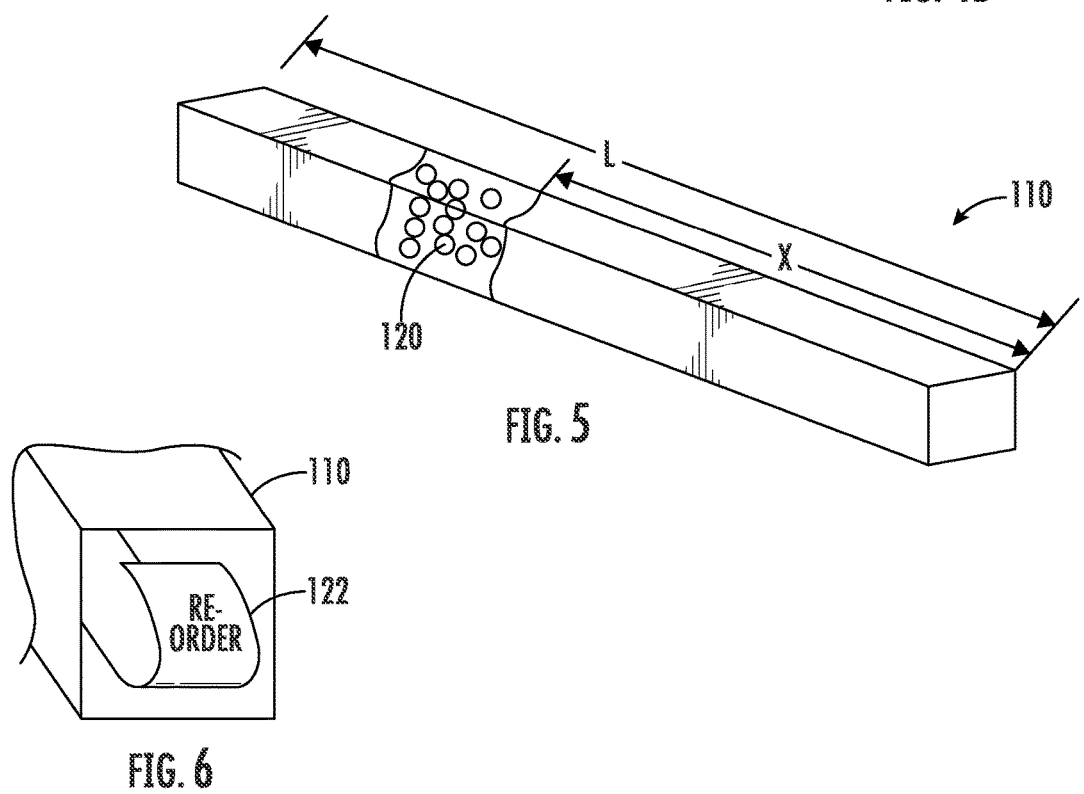
FIG. 5
FIG. 6

WAREHOUSE STORAGE AND RETRIEVAL SYSTEM FOR FISHING RODS AND FISHING ROD BLANKS

RELATED APPLICATIONS

The present invention is related to Provisional Patent Application Ser. No. 63/122,595 filed Dec. 8, 2020, the entire contents of which are incorporated herein by reference.

FIELD OF THE INVENTION

The present invention relates to the field of warehouse storage systems, and more particularly to a warehouse storage and retrieval system for fishing rods and fishing rod blanks.

BACKGROUND

The storage of goods in a warehouse and, in particular, fishing rods and fishing rod blanks, can consume a significant amount of space. Currently, the rods and rod blanks are stored in vertical placed boxes causing them to fan out of the top ends of the open boxes. In addition, the vertically placed boxes do not efficiently use floor space.

The typical configuration of the vertically placed boxes also makes it difficult for the picker to find the correct fishing rod or rod blank to fill an order. Moreover, some of the fishing rods or rod blanks may be shorter than a length of the box making it difficult to retrieve the item inside. Also, the vertically placed boxes require the picker to look inside the box from the top end to see if the product is in there or whether the box is empty. This is a time-consuming process and inefficient.

Accordingly, there is a need in the art for a warehouse storage and retrieval system for fishing rods and fishing rod blanks that uses warehouse space efficiently and that is also configured to be able to find and retrieve items efficiently.

SUMMARY

In a particular illustrative embodiment, a warehouse storage and retrieval system for fishing rod blanks is disclosed. The system includes a framework structure comprising a plurality of front horizontal supports, and a plurality of rear horizontal supports. The system also includes a plurality of individual storage receptacles supported between the plurality of front horizontal supports and the rear horizontal supports in a horizontal orientation, where each receptacle has an open end proximate the plurality of front horizontal supports and an opposing closed end proximate the plurality of rear horizontal supports. The system includes a plurality of fishing rod blanks within the plurality of individual storage receptacles, and where each fishing rod blank has an identifying tag storing data. In addition, the system includes a database storing a spatial location of each of the fishing rod blanks corresponding to a respective individual storage receptacle within the framework structure.

The plurality of fishing rod blanks, each having a first end and a second end, may have first ends proximate to the closed ends of the plurality of individual storage receptacles and second ends proximate the open ends of the plurality of individual storage receptacles. The system may also include a portable reader configured to read the identifying tag and display the data of a respective fishing rod blank. The individual storage receptacles are arranged in horizontal rows and vertical columns and may have a rectangular cross section or a triangular cross section. The system may also include an adjustment device slidingly engaging an interior of a respective individual storage receptacle and configured to shorten a distance from the open end.

The system may include a plurality of sequential vertical indicators and a plurality of sequential horizontal indicators positioned to correlate with the plurality of horizontal rows and plurality of vertical columns, respectively. A visual indicator may be configured to be triggered to display at the open end of a respective individual storage receptacle when empty. The database may be in communication with the portable reader and configured to transmit the spatial location of a respective rod blank to the portable reader.

In another particular aspect, a framework structure for storing fishing rod blanks is disclosed. The framework includes a plurality of front horizontal supports, and a plurality of rear horizontal supports. In addition, the framework includes a plurality of individual storage receptacles supported between the plurality of front horizontal supports and the rear horizontal supports in a horizontal orientation, where each receptacle has an open end proximate the plurality of front horizontal supports and an opposing closed end proximate the plurality of rear horizontal supports. A database stores a spatial location of each of the fishing rod blanks corresponding to a respective individual storage receptacle within the framework structure.

The plurality of individual storage receptacles are configured to receive a plurality of fishing rod blanks and each fishing rod blank has an identifying tag storing data. A database stores a spatial location of each of the fishing rod blanks corresponding to a respective individual storage receptacle within the framework structure. The plurality of fishing rod blanks have first ends proximate to the closed ends of the plurality of individual storage receptacles and second ends proximate the open ends when inserted into the plurality of individual storage receptacles. A portable reader may be configured to read the identifying tag and display the data of a respective fishing rod blank. The individual storage receptacles are arranged in horizontal rows and vertical columns and the plurality of individual storage receptacles may have a rectangular or triangular cross section. The framework structure may also include an adjustment device slidingly engaging an interior of a respective individual storage receptacle and that is configured to shorten a distance from the open end.

In another particular aspect, a warehouse storage and retrieval method for fishing rod blanks is disclosed. The method includes providing a framework structure comprising a plurality of front horizontal supports, and a plurality of rear horizontal supports. The method also includes positioning a plurality of individual storage receptacles supported between the plurality of front horizontal supports and the rear horizontal supports in a horizontal orientation, with each receptacle having an open end proximate the plurality of front horizontal supports and an opposing closed end proximate the plurality of rear horizontal supports. In addition, the method includes inserting a plurality of fishing rod blanks within the plurality of individual storage receptacles, with each fishing rod blank having an identifying tag storing data, and storing in a database a spatial location of each of the fishing rod blanks corresponding to a respective individual storage receptacle within the framework structure. The method may also include using a portable reader configured to read the identifying tag and to display the data of a respective fishing rod blank.

BRIEF DESCRIPTION OF THE DRAWINGS

FIG. 4A is a schematic of a graphical user interface and database of the system of FIG. 1;

FIG. 4B is a schematic of a rod blank and portable reader of the system;

FIG. 5 is a schematic of an adjustment device to shorten an interior length of the individual storage receptacles of FIG. 1; and FIG. 6 is a detailed view of an individual storage receptacle having a visual indicator to indicate the storage box is empty.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
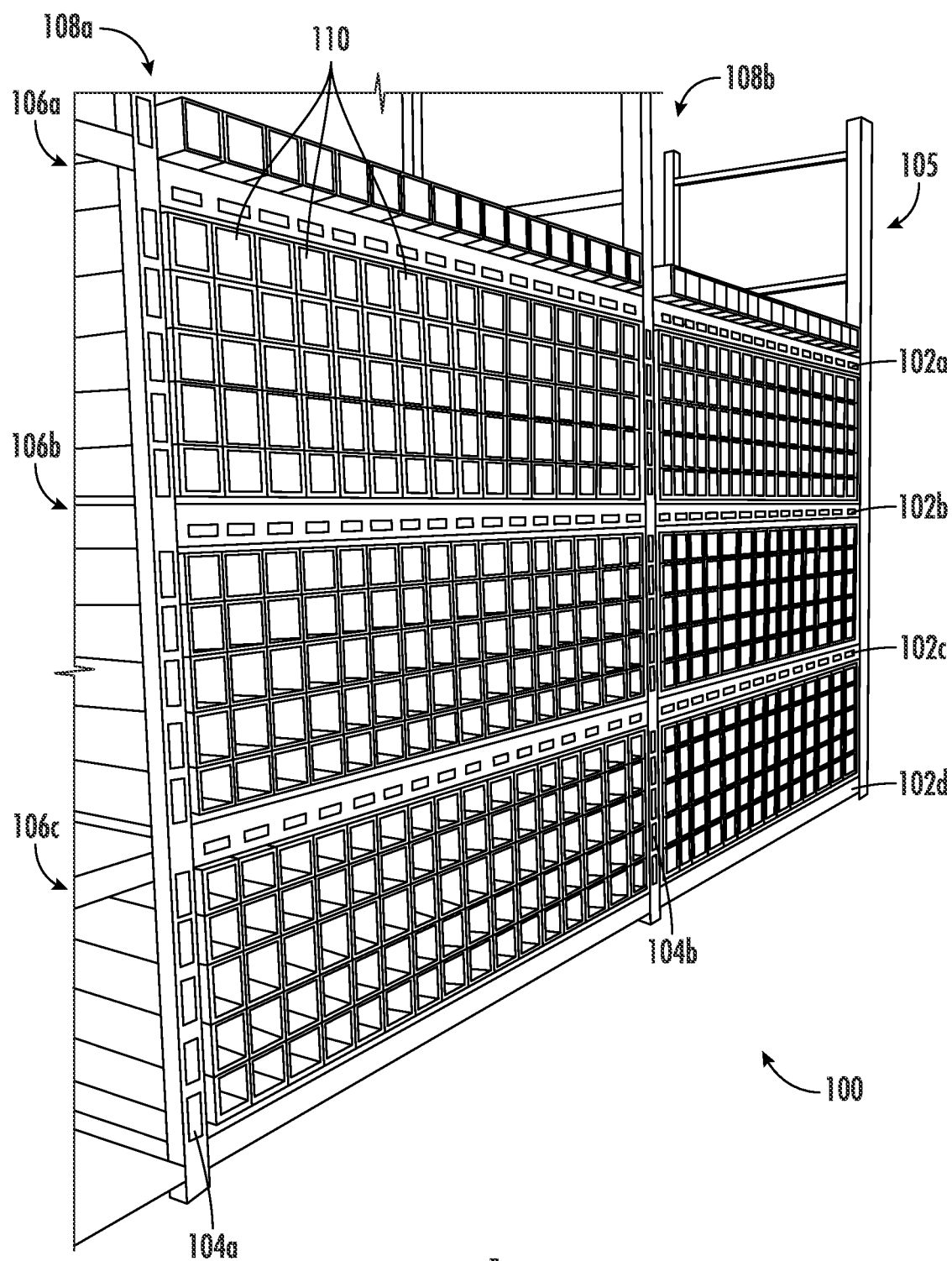
FIG. 1 is a perspective schematic view of a warehouse storage and retrieval system for fishing rods and rod blanks in which various aspects of the disclosure may be implemented.

Referring initially to FIG. 1, a warehouse storage and retrieval system for fishing rods and rod blanks is illustrated and generally designated 100. The system 100 is configured to store fishing rods or fishing rod blanks horizontally for space savings. The system 100 may be implemented on pallet racks with cardboard dividers or boxes as described in more detail below in eight foot wide by eight foot tall sections on the pallet racks.

The system 100 includes a framework structure 105 that includes a plurality of front horizontal supports 102a-d, and a plurality of front vertical supports 104a-b that form racks for individual storage receptacles 110. The individual storage receptacles 110 may be five by five inch square boxes and be approximately eight feet in length. The individual storage receptacles 110 may be comprised of cardboard or other similar material. Each of the front horizontal supports 102a-d include column labels 106a-c. The column labels 106a-c in turn have a sequence of characters, such as numbers, that identify each particular column. For example, the left most column label 106a may comprise the number "1" and the adjacent column may be "2" and so on.

Similarly, each of the front vertical supports 104a-b include row labels 108-b have a sequence of characters, such as letters, that identify each particular row. For example, the upper most row label 108a may comprise the letter "A" and the row beneath it may be the letter "B" and so on. Accordingly, the left most, and upper most individual storage receptacle can be identified by "1A". Thus, if a product that a picker is looking for is identified as being stored in storage receptacle "1A", the picker would know to look in the upper most, and left most individual storage receptacle to retrieve that particular product.

Figure 2A:
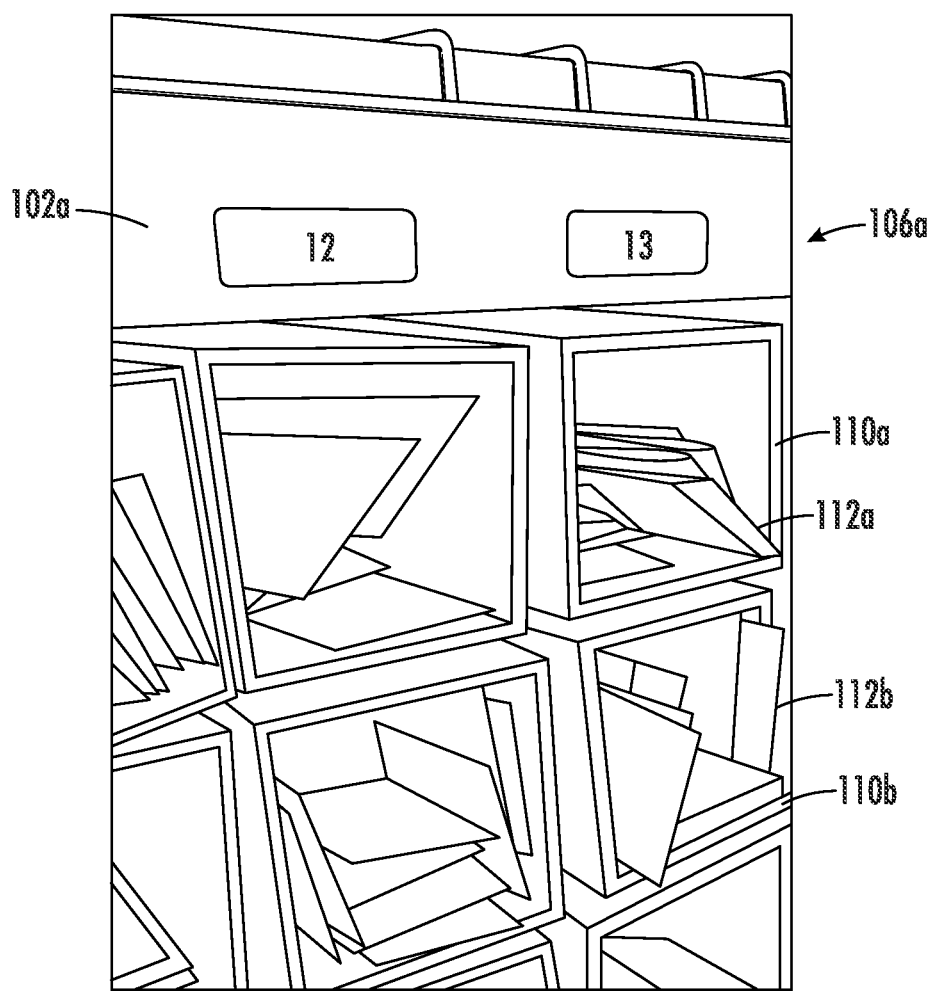
FIG. 2A is a detailed view of an individual storage receptacle of the system of FIG. 1.

Referring now to FIG. 2A, a detailed view of the individual storage receptacles 110 is shown with an upper storage receptacle 110a being supported by lower storage receptacle 110b. As visible in FIG. 2A, the fishing rods or fishing rod blanks 112a, 112b extend to the end of an open end of the respective individual storage receptacle 110a, 110b. The picker can easily grasp the product from the desired storage receptacle 110a, 110b and remove it.

Figure 2B:
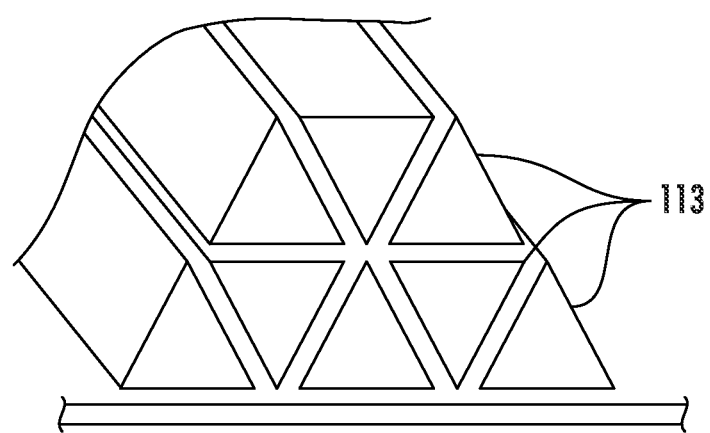
FIG. 2B is a detailed view of an alternate shape of an individual storage receptacle of FIG. 1.

In a particular aspect, the individual storage receptacles are triangular shaped 113 in cross section rather than square or rectangular shaped as shown in FIG. 2B. The triangular shape provides for the more efficient use of space of different products in less space than a square shaped storage receptacle.

Figure 3:
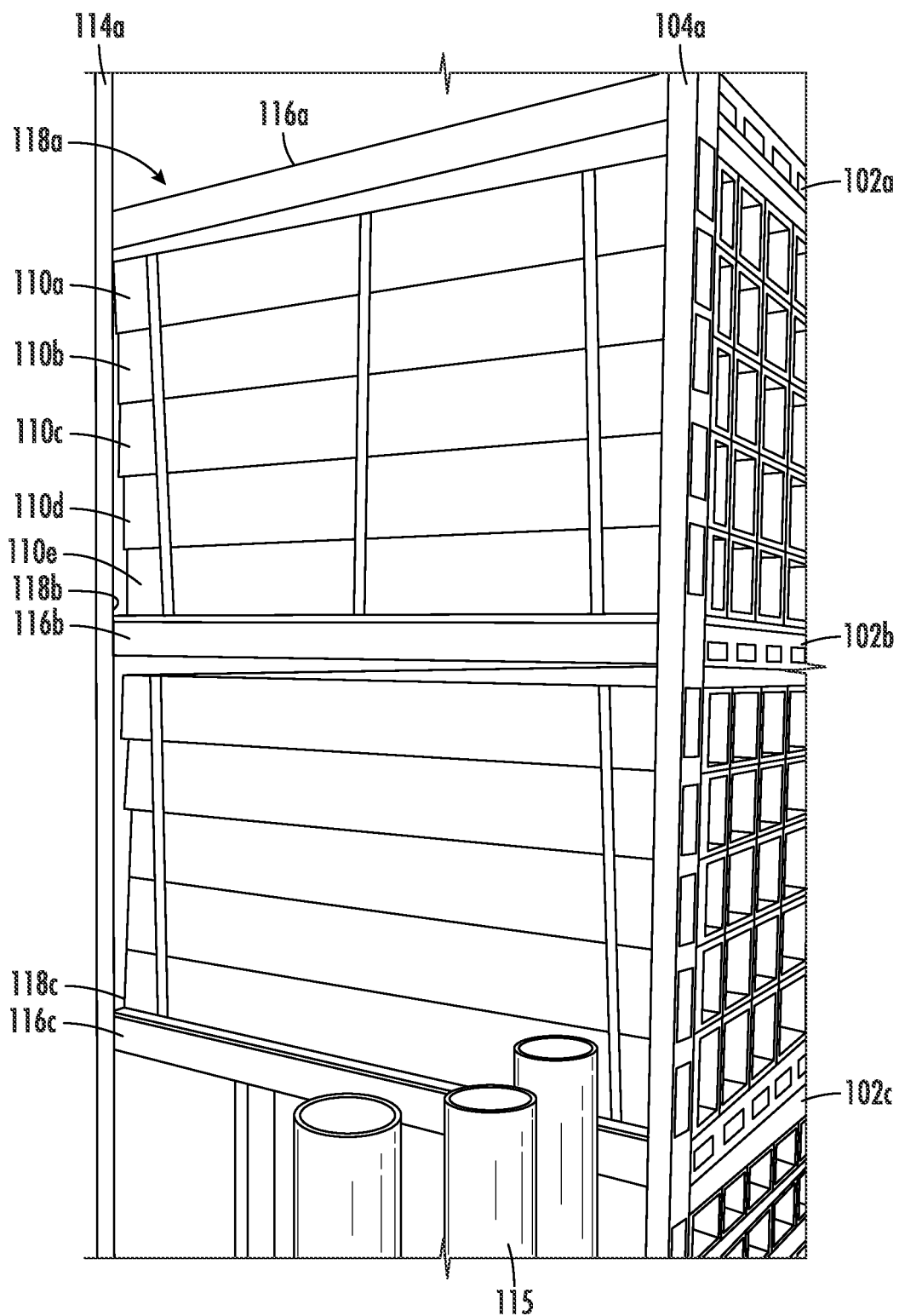
FIG. 3 is a side view of the system of FIG. 1.

Referring now to FIG. 3, a schematic showing a side view of the system 100 is illustrated. In particular, the individual storage receptacles 110a-e, span across from front to back of the framework structure 105. A rear vertical support 114a and a corresponding front vertical support 104a are connected by a plurality of horizontal supports 116a-c that span therebetween. Rear horizontal supports 118a-118c form the support for a rear side of the framework structure 105 of the system 100.

The individual storage receptacles 110a-e have a square or rectangular cross section and elongated length to allow support of the fishing rods and fishing rod blanks along their entire length. In comparison, the existing storage containers 115 that support the products in a vertical fashion, do not provide support along their length and will allow the fishing rods and rod blanks to fan out.

Referring now to FIG. 4A, as part of the retrieval aspect of the system 100, a computer 202 having a processor 207 and memory 208 storing a database 204. The computer 202 is configured to display a graphical user interface 205 that is used to identify where a particular product is stored. The database 204 is configured to store a spatial location of each of the fishing rod blanks corresponding to a respective individual storage receptacle 110 within the framework structure 105. For example, if the picker wants to retrieve a "blue rod" 112a, the picker uses the GUI to enter in "blue rod." The computer 202 accesses the database 204 to determine where the "blue rod" 112a is stored. In this particular example, the computer 202 returns that the "blue rod" 112a is stored in "4C". The picker then can retrieve the "blue rod" 112a that is stored in the storage receptacle that corresponds to column "4", and row "C".

Each of the fishing rod blanks 110a have an identifying tag 115a, as shown in FIG. 4B, that stores data about the product to which it is secured. Accordingly, once the picker pulls the "blue rod" 112a, a portable reader 117 is used to read the identifying tag 115a and display the data of the respective fishing rod blank. The picker can then confirm that the correct product has been retrieved.

In another particular aspect, an adjustment device 120 is used to shorten an interior length of the individual storage receptacle 110. The overall length of the storage receptacle 110 is defined by "L", which a typical storage box may be eight feet in length. Accordingly, if a fishing rod blank is only four feet in length, the fishing rod blank is susceptible to being pushed back to an end of the individual storage receptacle 110 making it difficult to retrieve by the picker. The adjustment device 120 can be placed four feet inside the individual storage receptacle 110 to prevent the rod blank from being pushed too far in that makes it difficult for the picker to retrieve. The adjustment device 120 may be cardboard or something similar that can be held in place within the individual storage receptacles 100 using a friction fit or fasteners as can be appreciated by those of ordinary skill in the art.

Yet another improvement to storing and retrieving fishing rods and rod blanks is the use of a physical visual indicator 122 that indicates when an individual storage receptacle 110 is empty. Thus, the picker can see that the individual storage receptacle 110 is empty without having to look inside the storage receptacle 110 when a picker is looking to retrieve a product. Accordingly, this saves time and makes the system 100 more efficient. The visual indicator 122 may be a spring loaded sign that pops up when the last fishing rod blank is removed from the storage receptacle 110, or may be a tag, stand-up sign, or something similar that can be placed in the open end of the storage receptacle 110 and easily seen by the picker.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A warehouse storage and retrieval system for fishing rod blanks comprising:
   a framework structure comprising a plurality of front horizontal supports, and a plurality of rear horizontal supports;
   a plurality of individual storage receptacles supported between the plurality of front horizontal supports and the rear horizontal supports in a horizontal orientation, each receptacle having an open end proximate the plurality of front horizontal supports and an opposing closed end proximate the plurality of rear horizontal supports, wherein the individual storage receptacles are arranged in horizontal rows and vertical columns;
   a plurality of fishing rod blanks within the plurality of individual storage receptacles, and each fishing rod blank having an identifying tag storing data, wherein the plurality of fishing rod blanks have first ends proximate to the closed ends of the plurality of individual storage receptacles and second ends proximate the open ends of the plurality of individual storage receptacles;
   a visual indicator configured to be triggered to display at the open end of a respective individual storage receptacle when empty;
   a database storing a spatial location of each of the fishing rod blanks corresponding to a respective individual storage receptacle within the framework structure; and
   a portable reader configured to read the identifying tag and display the data of a respective fishing rod blank.

2. The system of claim 1, wherein the plurality of individual storage receptacles have a rectangular cross section.

3. The system of claim 1, wherein the plurality of individual storage receptacles have a triangular cross section.

4. The system of claim 1, further comprising an adjustment device slidingly engaging an interior of a respective individual storage receptacle and configured to shorten a distance from the open end.

5. The system of claim 1, further comprising a plurality of sequential vertical indicators and a plurality of sequential horizontal indicators positioned to correlate with the plurality of horizontal rows and plurality of vertical columns, respectively.

6. The system of claim 1, wherein the database is in communication with the portable reader and configured to transmit the spatial location of a respective rod blank to the portable reader.

7. A framework structure for storing fishing rod blanks comprising:
   a plurality of front horizontal supports, and a plurality of rear horizontal supports;
   a plurality of individual storage receptacles supported between the plurality of front horizontal supports and the rear horizontal supports in a horizontal orientation, each receptacle having an open end proximate the plurality of front horizontal supports and an opposing closed end proximate the plurality of rear horizontal supports, wherein the individual storage receptacles are arranged in horizontal rows and vertical columns;
   a visual indicator configured to be triggered to display at the open end of a respective individual storage receptacle when empty; and
   a database storing a spatial location of each of the fishing rod blanks corresponding to a respective individual storage receptacle within the framework structure.

8. The framework structure of claim 7, wherein the plurality of individual storage receptacles are configured to receive a plurality of fishing rod blanks and each fishing rod blank has an identifying tag storing data.

9. The framework structure of claim 8, wherein the plurality of fishing rod blanks have first ends proximate to the closed ends of the plurality of individual storage receptacles and second ends proximate the open ends when inserted into the plurality of individual storage receptacles.

10. The framework structure of claim 9, further comprising a portable reader configured to read the identifying tag and display the data of a respective fishing rod blank.

11. The framework structure of claim 7, wherein the plurality of individual storage receptacles have a rectangular cross section.

12. The framework structure of claim 7, wherein the plurality of individual storage receptacles have a triangular cross section.

13. The framework structure of claim 7, further comprising an adjustment device slidingly engaging an interior of a respective individual storage receptacle and configured to shorten a distance from the open end.

14. A warehouse storage and retrieval method for fishing rod blanks comprising:
   providing a framework structure comprising a plurality of front horizontal supports, and a plurality of rear horizontal supports;
   positioning a plurality of individual storage receptacles supported between the plurality of front horizontal supports and the rear horizontal supports in a horizontal orientation, each receptacle having an open end proximate the plurality of front horizontal supports and an opposing closed end proximate the plurality of rear horizontal supports;
   inserting a plurality of fishing rod blanks within the plurality of individual storage receptacles, and each fishing rod blank having an identifying tag storing data;
   triggering a visual indicator to display at the open end of a respective individual storage receptacle when empty; and storing in a database a spatial location of each of the fishing rod blanks corresponding to a respective individual storage receptacle within the framework structure.

15. The method of claim 14, further comprising using a portable reader configured to read the identifying tag and to display the data of a respective fishing rod blank.

\* \* \* \* \*